3,178,611
DIRECT CURRENT ELECTROLUMINESCENT PHOSPHORS

Marcel J. Vogel, San Jose, Calif., assignor to International Business Machines Corporation, New York, N.Y., a corporation of New York
No Drawing. Filed Mar. 12, 1962, Ser. No. 179,186
8 Claims. (Cl. 315—363)

This invention relates to direct current electroluminescence and, more particularly, to phosphors exhibiting direct current induced electroluminescence and processes for the preparation of such phosphors.

Electroluminescence under the action of alternating current is known, but the level of light which may be produced by such action is extremely low in quantity and in relationship to the inducing current. Direct current electroluminescence, as known, is temporary and of no value. The only previous D.C. electroluminescent materials known to the applicant comprise suspensions of materials like zinc sulfide in a liquid between two conductive plates. Luminescence obtainable from such systems is insufficient to actuate available light meters, even when using an instrument sensitive to 0.005 microwatt per cm.$^2$.

Direct current luminescent phosphors are prepared in the process of my invention by applying to a substantially photofluorescent, nonelectroluminescent, triboluminescent phosphor crystal, a stress sufficient to substantially destroy the triboluminescent and photofluorescent properties of the crystal.

The triboluminescent crystals utilized to form the electroluminescent phosphors of my invention are well known to the art. Phosphor crystal size is preferably established by elemental content, cooling rate, etc., rather than by grinding; as grinding substantially destroys the triboluminescent, photofluorescent and electroluminescent properties of the crystals. A preferred example of such a phosphor is a zinc sulfide manganese chlorine (ZnSMnCl) phosphor. This preferred phosphor can be prepared from 50 grams of zinc sulfide, 1 gram of potassium chloride, and 0.18 gram of manganese chloride ($MnCl_2.4H_2O$). The manganese chloride is blended with the potassium chloride, and the blend mixed thoroughly with the zinc sulfide phosphor. The resulting mixture is fired for 45 minutes at 1,000° C. and cooled rapidly in the air. Firing the phosphor for about 45 minutes at a temperature of about 1,000° C. forms mixed crystals of cubic and hexagonal form which have a pink fluorescence under long wave ultra-violet light. Firing at 1,200° C. produces essentially hexagonal form crystals. Phosphors prepared in the manner described, excited at 250 volts D.C., have shown 15.8 microwatts per cm.$^2$, or approximately 9 foot lamberts.

Other phosphors which may be used in the place of the preferred phosphor just given are:

(a) ZnS(Mn)
(b) ZnCdS(Mn)
(c) ZnS(Cu-Mn)
(d) ZnCdS(Cu-Mn)
(e) ZnS(Pb-Mn)
(f) ZnCdS(Pb-Mn)

The ZnCds-Cu-Mn phosphor heretofore described as one of the most satisfactory triboluminescent phosphors, is sold under the name L-302-A-1 available commercially. X-ray analysis of a sample indicated a composition of 63.5% ZnS, 36% Cds and ½% $Mn(NO_3)_2.6H_2O$. Copper was indicated by emission spectograph to be less than 0.1%, and there was a trace of silicon. The product had an average particle size of 31.0 microns and a porosity of .500. Crystal study indicated that the zinc sulfide was mostly of the alpha form with some of the beta form. The phosphors were either mixed crystals or a crystalline solid solution between zinc sulfide and cadmium sulfide.

Another phosphor sample sold under the name USRC 3630 available commercially on X-ray analysis indicated 98.80% zinc sulfide and 1.1% manganese nitrate. This product, on emission spectograph analysis, showed less than .1% copper and a trace of silicon. On wet chemical analysis 0.1% zinc oxide was found. The average particle size was 11.50 microns and the porosity .500. The crystal structure indicated a small amount of beta zinc sulfide, cubic, and a large amount of alpha zinc sulfide, hexagonal.

Using the above phosphors and a halide, for example, potassium chloride, hydrochloric acid, or hydroformic acid, as an electrolyte, it has been found that the application of an A.C. field through the electrolyte into the phosphor film using 50 to 400 volts R.M.S. at from 20 to 4000 cycles while the surface under treatment is scratched slightly as with a needle, the scratched areas develop electroluminescent areas. There is no need in such cases for external radiation. It would appear that the same changes have been produced in the crystal lattice structure.

While single crystal D.C. luminescent lamps can be formed, I prefer to prepare the D.C. luminescent phosphor crystals while preparing electroluminescent panels in which the phosphor crystals are utilized. Prior to discussing the preparation of such panels, it should be noted that, contrary to practice in the preparation of A.C. luminescent panels, there must be a continuous electrical path through the panel. Also, while it is preferable to employ one crystal layer between electrodes, two or more layers can be utilized so long as they are in intimate contact with one another in the panel binder material and are, where the crystals project from the binder material, in intimate contact with the electrode material.

One means of simultaneously forming the electroluminescent phosphors and panels is to spray the phosphor particles into a viscous material so as to imbed the particles in the film, stressing the phosphor particles, hardening the film, and attaching electrodes to opposite sides of the film.

The D.C. luminescent phosphors of my invention can be prepared by any means wherein a desired amount of stress is applied to the crystal. One means of accomplishing this result is to spray the phosphor particles into a viscous material. Later arriving phosphor crystals strike the imbedded particles and apply a shearing force to the crystal. Apparently, phosphor particle momentum causes sufficient energy transfer within a viscous material to cause the stressing of most crystals, even where there is a plurality of contacting crystal layers in the film. While it is preferable to "sandblast" phosphor crystals in a viscous film with additional phosphor particles, any hard-nonreactive agent can be utilized for this purpose. Among the agents useful for the "sandblasting" step are included phosphors, silicon dioxides, clays, nitrides, carbides, and metal particles. In addition to being stressed by "sandblasting" type operations, crystals can be stressed by contact with an electric arc or ultrasonic sound waves. The viscous film containing the phosphor particles can be overlaid with a polymer film and a roller passed over the surface of the polymer film to stress the phosphor. A glass plate can be placed over the phosphor film and an angular force applied thereto. The phosphor grains in a vehicle can also be stressed while being printed on a substrate.

In preparing the D.C. luminescent phosphors of my invention, the amount of stress which can be applied to the phosphor crystals can be gauged by the loss of triboluminescence and photofluorescence during stressing.

Good D.C. and A.C. luminescence occurs when the triboluminescence and photofluoroescence of the phosphor crystal are substantially extinguished and, although the phosphor crystal will withstand some further stressing without destruction of the newly formed luminescent property, there is little need to further stress the crystal and thereby run the risk of destroying the electroluminescent property of the crystal.

It is theorized that the crystal should be stressed sufficiently to exceed the elastic limit of the crystal, without fracturing the crystal.

Viscous materials useful in preparing electroluminescent panels are well known to the art, but where adhesion to glass is desired, I prefer to utilize a viscous film containing an epoxy resin, e.g., Epon 1007, available commercially, a phenolic resin intermediate, e.g., one such as is disclosed in Example VI of U.S. Patent No. 2,579,330, and polyvinyl methyl ether in a ratio of about 56:32:12. This film can be cured by cooking for about one-half hour at 170° C.

This application is a continuation-in-part of my copending U.S. patent application Serial No. 54,845, filed September 9, 1960, which, in turn, was a continuation-in-part of my U.S. patent application Serial No. 824,667, filed July 2, 1959.

The following examples more fully illustrate my invention but it is not intended that my invention be limited to the exact phosphors, films, configurations, curing times, etc., disclosed.

*Example I*

A zinc sulfide manganese chlorine phosphor was prepared by blending manganese chloride and potassium chloride and mixing the blend thoroughly with zinc sulfide phosphor. The resulting mixture was placed in a Vycor crucible, the cover attached, and fired for 45 minutes at 1,000° C. The phosphor and crucible were cooled rapidly in the air.

A glass panel was prepared for coating with a resin. A resin was prepared by, first, making a mixture of 50 cc. of a solution of butylated urea-formaldehyde commercially available resin No. 22–8, 50% solids in solvent consisting of 30 parts by volume butyl alcohol and 20% by volume of xylol; 200 cc. of a resinous solution made up of 20 gms. of Epoxy No. 2667, 80 cc. of toluene and 20 cc. of normal butyl alcohol. To this mixture was added 20 cc. of a commercially available silicon resin SR–82 which was added as a flow control agent. This resin solution contained 60% resin and utilized xylol as a solvent. This mixture was then combined with ⅓ by volume of equal parts isophorone, ethyl amyl ketone and xylol. A small portion of methyl nadic anhydride was added to insure good adhesion to the glass slide. The resin was applied to a glass slide as a film of about 2 mils thickness and heated gently to remove the solvents.

Classified phosphor particles were then sprayed onto the film at 60 lbs. pressure from a spray gun, Model V, available commercially, having a 1.5 mm. orifice, and the resin film cured by maintaining the film at a temperature of about 170° C. for one-half hour. After completion of the curing step, the protruding ends of the imbedded phosphor were coated with a silver paint and dried to form an A.C.-D.C. electroluminescent panel. The electroluminescent panel was found to have an output of about 15 milliwatts/cm.$^2$ at 150 volts steady-state D.C.

*Example II*

Films were prepared utilizing ZnS.Cu.Mn and ZnCdS.CuMn phosphors. Such films showed no A.C. electroluminescence from 100–700 volts at 1,000–10,000 c.p.s. A vacuum leak detector available commercially, i.e., a Tesla coil, was placed about two inches above the panels. Exposure to the field surrounding the coil cause the phosphor grains to glow with the same yellow color that the phosphors emit when pressed to cause triboluminescence. There was no arc or visible corona between the panels and the Tesla coil. After treatment, the areas of phosphor crystals which glowed where exposed to the action of the Tesla coil were A.C. and D.C. electroluminescent.

Now, having described my invention, what I claim is:

1. A phosphor exhibiting the property of steady-state direct current electroluminescence and formed by applying to a triboluminescent phosphor crystal a stress sufficient to substantially extinguish the triboluminescent property of the phosphor, but insufficient to rupture the phosphor cross-sectionally.

2. A process for inducing the direct current electroluminescence of phosphors comprising subjecting a triboluminescent phosphor to a physical stress sufficient to substantially extinguish the triboluminescent property of the phosphor but insufficient to cross-sectionally rupture the phosphor.

3. A process for the preparation of direct current electroluminescent means comprising subjecting a zinc sulphide phosphor layer to a shear stress sufficient to substantially extinguish the triboluminescent property of the phosphor but insufficient to cross-sectionally rupture said layer.

4. The process of claim 3 wherein the stressing is carried out by imbedding the phosphor in a flexible film and thereafter sandblasting the phosphor crystals to apply shearing forces sufficient to effectively extinguish the triboluminescent property of the phosphor.

5. The process of claim 3 wherein said triboluminescent phosphor is imbedded in a flexible film and thereafter subjected to the shearing action of an electrical discharge.

6. A D.C. electroluminescent device comprising in combination:
   a layer of triboluminescent phosphor material;
   a first conductive sheet adjacent one side of said layer;
   a second conductive sheet adjacent the other side of said layer, said second sheet being transparent;
   a source of D.C. potential connecting said sheets; and
   means for applying a shearing stress to said layer just sufficient to extinguish the triboluminescene thereof without rupturing said layer.

7. The combination as recited in claim 6 wherein said phosphor material comprises a zinc sulphide phosphor.

8. An electroluminescent device comprising in combination:
   a layer of photofluorescent phosphor material;
   D.C. potential means contacting surfaces of said layer and adapted to impress a D.C. voltage thereacross; and
   stress means for applying a shearing stress to said layer just sufficient to extinguish the photofluorescence thereof without rupturing said layer.

References Cited by the Examiner

UNITED STATES PATENTS 2,470,451 5/49 Wood _____ 252—301.6
2,772,242 11/56 Butler _____ 252—301.6

GEORGE N. WESTBY, *Primary Examiner.*

M. A. BRINDISI, *Examiner.*